Patented May 5, 1953

2,637,715

UNITED STATES PATENT OFFICE 2,637,715

EPOXY RESIN-POLYCARBOXYLIC ACID-DICYANDIAMIDE REACTION PRODUCTS

Gustav H. Ott, Riehen, Switzerland, assignor to Ciba Limited, Basel, Switzerland, a Swiss firm No Drawing. Application June 27, 1949, Serial No. 101,681. In Switzerland July 5, 1948

15 Claims. (Cl. 260—44)

The present invention relates to the manufacture of resin solutions suitable for making lacquers, and to lacquers made therewith.

Patent No. 2,458,796 describes a process for making a resin solution which is suitable as a raw material for making lacquers and which is made from a resinous ethylene oxide derivative of a phenol, wherein a resinous ethylene oxide phenol derivative containing at least two ethylene oxide groups is heated in the presence of a solvent with dicyandiamide and an aldehyde condensation product containing etherified methylol groups. It is also proposed to work with the addition of an organic acid such as glacial acetic acid, benzoic acid, oxalic acid or adipic acid, but only in the presence of a very small amount not exceeding 0.4 per cent. of the weight of the ethylene oxide derivative.

The resin solutions so obtained, when diluted with the usual lacquer solvents, yield lacquers which are subjected to hardening by heat at baking temperatures advantageously of about 100–200° C. and a baking period up to 2 hours. Lacquer films produced in this manner adhere equally well to rough or polished metal surfaces and, notwithstanding their great hardness, have an excellent flexibility. They are also to a great extent stable towards organic solvents, oils, acids, alkalis, water and the like. Such lacquer coatings are entirely satisfactory for normal requirements such, for example, as those of the canning industry. However, they do not suffice when, in addition to these good chemical and mechanical properties, high resistance to heat is also desired, that is to say, a high insensitivity to over-hardening or after-hardening.

In some cases it is necessary in practice for reasons of safety to produce thick, that is to say, multi-layer lacquer coatings which offer the greatest insensitivity towards chemicals, solvents and the like and which at the same time resist heat for long periods. The latter requirement necessitates high insensitivity of the lacquer coating to overhardening or after-hardening. This applies especially in the manufacture of metal containers which are provided with a thick, that is to say, multi-layer lacquer coating and must withstand working temperatures of 100° C. In baking the various layers of lacquer the first layer, the so-called adhesion layer, has to be subjected to as many hardening operations as there are layers to be applied. For example, in the case of applying six layers of lacquer the lowermost layer is subjected to hardening six times. However, under no circumstances must over-hardening of the lacquer coatings due to the long hardening period occur, because the adhesion and flexibility would be unfavourably affected.

Similar requirements apply to the coating of copper wire with several layers of lacquer (enameling), in which case each layer is generally hardened at temperatures ranging from 300–450° C. For such purposes the resin solutions mentioned above are not suitable.

The present invention is based on the unexpected observation that by suitably combining resinous ethylene oxide derivatives of phenols with certain poly-basic carboxylic acids and with dicyandiamide in the presence of a solvent, resin solutions can be obtained which fulfill higher requirements of the kind indicated above.

According to this invention a process for the manufacture of a resin solution suitable as a raw material for making lacquers bakeable at high temperatures and yielding very heat resistant coatings, and prepared from a resinous derivative of a polyhydric phenol which derivative contains at least two ethylene oxide groups, comprises heating one mol of the ethylene oxide derivative in the presence of a suitable organic solvent with from about 1/8 to at most 5/8ths of one equivalent of a polybasic carboxylic acid, of which the carboxyl groups are separated from one another by at least two carbon atoms, and with about 0.06–0.6 mol of dicyandiamide. The heating operation may be conducted in the presence of an aldehyde condensation product containing etherified methylol groups, and if desired, with the addition of a further quantity of dicyandiamide.

Since the size of the molecule of a resinous derivative of a polyhydric phenol which derivative contains two ethylene oxide groups is difficult to ascertain, and as it may carry several radicals of such phenols, a new "mol" conception has to be found. As one mol of the resinous ethylene oxide derivative there is to be understood herein one mol calculated as a hypothetical monomeric compound, which mol corresponds to the quantity of resin obtained in the reaction of epichlorhydrin with 1 mol of the polyhydric phenol under the conditions of the examples herein. By one equivalent of a polybasic carboxylic acid is meant the quantity corresponding to the formula $$\frac{\text{Mol}}{n}$$

where $n$ is equal to the number of carboxyl groups present in one molecule and "Mol" stands for molecular weight.

The present invention is also based on the observation that resin solutions having substantially the same properties can be obtained by using in the above process, instead of the polybasic carboxylic acids, their anhydrides. Lacquers prepared from these resin solutions yield coatings which generally harden somewhat more slowly than those obtained from lacquers prepared from resin solutions made with the carboxylic acids. In certain cases, for instance, in the multilayer lacquering of copper wire at very high temperatures this slower hardening is an advantage.

The quantities of the additions of carboxylic acid or carboxylic anhydride and dicyandiamide may vary widely within the aforesaid limits, provided that regard is paid to the following: The greater the quantity of the acid or anhydride added the greater is the insensitivity to heat of the finished baked lacquer coating but the lower is its capacity for hardening. With the addition of a large quantity of acid or anhydride and a small quantity of dicyandiamide there is obtained, for example, upon baking a lacquer coating which can be hardened only to a certain degree and is still thermoplastic at temperatures, for example, of 150° C. and above. If, on the other hand, the quantity of dicyandiamide is increased, the capacity for hardening out is increased, that is to say, the thermoplasticity of the lacquer coating is correspondingly reduced. A lacquer coating which is in a high degree heat-resistant and is still slightly thermoplastic only at high temperatures can be produced by using, per mol of the resinous ethylene oxide derivative, approximately one equivalent of the carboxylic acid or anhydride and about 0.5 mol of dicyandiamide.

The addition of aldehyde condensation products containing etherified methylol groups generally yields lacquers which are especially easy to apply and distribute uniformly. Moreover, they permit the quantity of dicyandiamide to be increased beyond the amount given above and so enable lacquer coatings to be produced which can be completely hardened-out. The amount of the added aldehyde condensation product required depends on the amount of dicyandiamide used and on the particular requirements which the lacquer is to fulfil. An expert can without great difficulty determine the most favourable relative proportions.

The ethylene oxide resins used as starting materials are obtained in known manner by the action of epihalogenhydrins or dihalogenhydrins, especially epichlorhydrin or dichlorhydrin on phenols in an alkaline medium.

As phenols there come into consideration those containing at least 2 hydroxyl groups. Especially suitable are polyhydric polynuclear phenols of which the phenol nuclei are connected together by carbon bridges such, for example, as 4:4'-dihydroxydiphenyl-dimethyl-methane (of which the ethylene oxide derivative is referred to hereinafter for brevity as "dimethylmethane resin") and the like.

In admixture with the aforesaid polynuclear phenols there may be used polynuclear phenols of which the phenol nuclei are connected together by sulphur bridges, for example, 4:4'-dihydroxydiphenyl sulphone.

However, other polyvalent phenols may be used for preparing the ethylene oxide derivatives, for example, resorcinol, hydroquinone, ortho:ortho'-diphenol or the like. Certain resinous phenol-aldehyde condensation products of the type of novolaks also yield useful ethylene oxide derivatives.

Experiments have shown that very good results are obtained with dimethyl methane resin, although lacquers prepared with the other ethylene oxide resins are equally useful for many purposes.

As polybasic carboxylic acids or anhydrides for use in the present invention there come into consideration aliphatic and cyclic carboxylic acids of which the carboxyl groups are separated from one another by at least two carbon atoms, such for example, as maleic acid, succinic acid, adipic acid, citric acid, sebacic acid, phthalic acid, maleic anhydride, succinic anhydride, phthalic anhydride and the like.

As aldehyde condensation products containing etherified methylol groups there may be used ethers, especially alkyl ethers, of methylol compounds, especially formaldehyde condensation products, of substances such as melamine, urea, dicyandiamide, phenol or the like, capable of forming hardenable condensates with formaldehyde. Especially important, however, are the alkyl ethers of methylol melamines and, although these are somewhat less important, alkyl ethers of methylol ureas. These ether resins may be used in the preformed state or may be formed from their components in the course of the process of the invention, provided that conditions in themselves known to favour the formation of ether resins are maintained.

The process of the invention may be carried out by first dissolving the ethylene oxide resin in a suitable solvent and then adding the remaining ingredients simultaneously or in succession, and bringing them into reaction by heat. The order in which the additions are made depends on practical considerations and is not confined to any particular system. If, in order to produce a lacquer coating which hardens out completely, the quantity of dicyandiamide exceeds that stated above care must be taken that there is present a sufficient quantity of the etherified methylol compound of an aldehyde condensation product to ensure that the dicyandiamide in the resin solution is completely taken up. It is of advantage to add the etherified methylol compound only when the reaction between the ethylene oxide resin, the carboxylic acid or anhydride and the initial quantity of dicyandiamide has taken place.

As suitable solvents there come into consideration organic solvent containing no free carboxyl groups, for example, members of the following groups: alcohols, ketones, hydrocarbons, chlorinated hydrocarbons, phenols, esters, ethers, glycol ethers and the like, which are advantageously used in the form of mixtures of at least two such solvents. It can be left to an expert to decide the best choice to make with regard to the boiling point and speed of evaporation in any particular case.

The following examples illustrate the invention. The dimethyl methane resin used in these examples is obtained by reaction of one mol of 4:4' - dihydroxydiphenyl-dimethylmethane with about 1.65 mols of epichlorhydrin in an aqueous solution of sodium hydroxide at a temperature ranging from 50–100° C., and has a molecular weight of about 300 (see columns 1–2). The parts are by weight:

*Example 1*

300 parts of dimethylmethane resin (about 1 mol) are dissolved in 133 parts of cyclohexanol at 100–120° C. The clear solution is mixed at 120° C. with 73 parts of adipic acid (about 0.5 mol) and 42 parts of dicyandiamide (about 0.5 mol), and the whole is stirred well for about 45 minutes. The temperature rises somewhat since the reaction is exothermic. The heating of the reaction vessel is controlled so that after a duration of reaction of about 45 minutes the temperature of the reaction mass is 120–130° C. The resulting thickly viscous resin is stirred in a mixture of 150 parts of benzyl alcohol and 350 parts of orthodichlorobenzene for a further 30–60 minutes at about 100° C. About 1000 parts of a clear, highly viscous, practically neutral resin solution are obtained. The lacquer resin solution can be diluted with the usual lacquer solvents to produce a finished lacquer, which, when baked, for example, in several layers on copper wire at a temperature of 300–450° C., each of which layers may be individually hardened, yields a flexible and remarkably adherent insulation which is resistant to solvents and withstands prolonged exposure to temperatures up to 140° C. without over-hardening (brittleness) occurring. These coatings exhibit only slight thermoplasticity when subjected to high temperatures during use.

Similar results are obtained when the adipic acid and dicyandiamide in this example are added separately by first adding the adipic acid and then, for example, stirring the whole at 100–130° C. for one hour, and then adding the dicyandiamide whereupon the exothermic reaction sets in. Alternatively, the dicyandiamide may be added first and then the adipic acid without affecting substantially the properties of the final product.

By replacing in this example the adipic acid by 101 parts of sebacic acid (about 0.5 mol) or by 59 parts of succinic acid (about 0.5 mol), there is obtained a lacquer which when baked yields lacquer coatings which in general exhibit the same properties, except that the flexibility is somewhat greater in the case of sebacic acid, and somewhat smaller in the case of succinic acid.

By using in this example 88 parts of adipic acid (about 0.6 mol), instead of 73 parts (about 0.5 mol), a lacquer is obtained which is somewhat more turbid but upon baking yields lacquer coatings having substantially the same properties.

*Example 2*

300 parts of dimethylmethane resin (about 1 mol) are worked up into a finished lacquer in the manner described in Example 1 with 9.12 parts of adipic acid (about 0.063 mol) and 5.25 parts of dicyandiamide (about 0.063 mol).

In the case of a coating produced with this lacquer hardening with heat proceeds substantially more slowly than in the case of a coating produced with the lacquer of Example 1. The lacquer coating so obtained is very resistant to over-hardening and still has a pronounced thermoplasticity at high temperatures.

*Example 3*

300 parts of the resin described below (about 1 mol) are dissolved in 110 parts of cyclohexanol and 250 parts of ortho-dichlorobenzene, and condensed with 70 parts of adipic acid (about 0.48 mol) and 40 parts of dicyandiamide (about 0.48 mol) at 95–100° C. for about 30 minutes. The condensation product so obtained is taken up in 250 parts of benzyl alcohol and stirring for about 60 minutes at 90–100° C., whereby a clear resin solution of medium viscosity is obtained which can be diluted with the usual lacquer solvents to produce a finished lacquer.

The above lacquer yields coatings which harden rapidly on heating and adhere well, but which are less flexible than the coatings obtained as described in Example 1. The coatings are to a very great extent insensitive to prolonged exposure to temperatures up to about 100° C.

The resin of this example can be prepared as follows: 846 parts of phenol are condensed in known manner at a raised temperature with 540 parts of an aqueous formaldehyde solution of about 30 per cent. strength by volume with the addition of a small quantity of sulphuric acid, and then the product is purified by distillation with steam. The condensation product so obtained is reacted at a raised temperature with 1656 parts of epichlorhydrin with the addition of a corresponding quantity of caustic soda solution. The resin so formed is washed and freed from water, and has a molecular weight of about 300–312 (see columns 1–2).

*Example 4*

618 parts of dimethylmethane resin (about 2 mols) are dissolved in 266 parts of cyclohexanol at 80–116° C. The clear solution is heated with 124 parts of adipic acid (about 0.86 mol) for one hour at 120° C. 35 parts of dicyandiamide (about 0.42 mol) are then added, and the whole is stirred well for about 45 minutes. The temperature rises somewhat owing to the exothermic reaction. The heating of the reaction vessel is so controlled that the temperature in the reaction mass is about 120–130° C. after the reaction has proceeded for about 45 minutes. The resulting thickly viscous resin is dissolved in a mixture of 150 parts of benzyl alcohol and 450 parts of orthodichlorobenzene, and the solution is mixed with 70 parts of dicyandiamide (about 0.84 mol), 169 parts of a solution of about 75 per cent. strength by weight of hexamethylolmelamine butyl ether in butanol, 190 parts of benzyl alcohol and 400 parts of butanol. The mixture is stirred for 1 hour at about 100° C., whereby a clear, highly viscous practically neutral resin solution is obtained which is diluted with the usual lacquer solvents to form a finished lacquer.

Upon baking several superposed layers of the lacquer, which spreads well, at temperatures of about 300–450° C., each of which layers may be individually hardened, there is produced a shiny, flexible, excellently adherent coating which is highly resistant to chemicals and can be maintained for long periods at temperatures of 100–140° C. without becoming brittle. The coating is no longer thermoplastic at higher temperatures, and is resistant to impact, flexing and scratching at temperatures ranging from −20° C. to +160° C.

*Example 5*

1000 parts of the highly viscous solution prepared as described in the first paragraph of Example 1 are stirred with 42 parts of dicyandiamide (about 0.5 mol), 95 parts of a solution of about 75 percent. strength by weight of hexamethylolmelamine butyl ether in butanol, 200 parts of ethylene glycol monoethyl ether (ethylglycol) and 50 parts of butanol for 1 hour at 90–100° C., whereby a clear resin solution of medium viscosity is formed.

A liquid produced by diluting the above resin solution in the usual manner yields upon hardening with heat coatings which resemble in their properties the coatings obtained as described in Example 4.

*Example 6*

300 parts of dimethylmethane resin (about 1 mol) are dissolved in 133 parts of cyclohexanol at 120–130° C. The solution is mixed with 83 parts of phthalic acid (about 0.5 mol) and 21 parts of dicyandiamide (about 0.25 mol), and then stirred for 45 minutes at 120–150° C. The resulting thickly fluid resin is then dissolved in a mixture of 225 parts of ortho-dichlorobenzene and 75 parts of benzyl alcohol. 42 parts of dicyandiamide (about 0.5 mol), 68 parts of a solution of about 75 per cent. strength by weight of hexamethylol-melamine butyl ether in butanol, 95 parts of benzyl alcohol and 210 parts of ethylene glycol monoethyl ether (ethyl-glycol) are mixed with the solution, and then the mixture is stirred for about 45 minutes at about 110° C. There is obtained a clear, practically neutral, highly viscous resin solution which can be diluted with the usual lacquer solvents to form a finished lacquer which spreads well.

A coating produced with the above lacquer when hardened by heat forms a very heat-resistant and flexible coating which adheres very well.

Example 7

73 parts of adipic acid (about 0.5 mol) and 21 parts of dicyandiamide (about 0.25 mol) are added to a solution, prepared at about 120° C., of 300 parts of dimethylmethane resin (about 1 mol) in 133 parts of cyclohexanol. The temperature rises somewhat owing to the exothermic reaction. The temperature of the reaction vessel is controlled so that the temperature of the reaction mass is about 120–130° C. after the reaction has proceeded for about 45 minutes. The resulting resin of medium viscosity is dissolved in a mixture of 125 parts of orthodichlorobenzene and 75 parts of benzyl alcohol, and then the solution is mixed with 63 parts of dicyandiamide (about 0.75 mol), 87 parts of a solution of about 75 per cent. strength by weight of hexamethylolmelamine butyl ether in butanol, 210 parts of butanol and 75 parts of benzyl alcohol. The mixture is stirred for about 30 minutes at about 110° C., whereby a clear practically neutral, resin solution of medium viscosity is obtained, which can be diluted in the usual manner to produce a finished lacquer.

The lacquer so obtained yields on iron, copper, aluminium and other metals rapidly hardening and excellently adherent coatings which are hard yet very flexible. The coatings are resistant to solvents and oils, and are also very insensitive to prolonged exposure to temperatures up to about 140° C. For example, they may be subjected for 24 hours to a temperature of 200° C. without any perceptible change in their properties.

In this example the adipic acid may be replaced with equal success by 102 parts of sebacic acid (about 0.5 mol) or 59 parts of succinic acid (about 0.5 mol).

Example 8

310 parts (about 1 mol) of a resin which has been obtained in known manner by the action of 2 mols of epichlorhydrin on 1 mol of ortho:ortho'-diphenol in an alkaline medium, are dissolved in 135 parts of cyclohexanol at 120° C. To the solution are added 100 parts of sebacic acid (about 0.5 mol) and 40 parts of dicyandiamide (about 0.48 mol), whereupon an exothermic reaction sets in which dies down in the course of about 45 minutes when the temperature ranges from 110–140° C., and then 45 parts of benzyl alcohol and 225 parts of ortho-dichlorobenzene are added. The resulting resin solution of medium viscosity is then mixed with 40 parts of dicyandiamide (about 0.48 mol), 100 parts of a solution of about 75 per cent strength of dimethylol-urea butyl ether in butanol, 95 parts of benzyl alcohol and 210 parts of ethylene glycol mono-ethyl ether (ethyl-glycol), and then the mixture is stirred for about 50 minutes at 100–110° C. There is obtained a clear resin solution of medium viscosity, which can be diluted in the usual manner to produce a finished lacquer.

The lacquer so obtained yields a rapidly hardening and good adhering coating which is hard and yet flexible and which after being baked is very insensitive to prolonged exposure to temperatures up to about 140° C.

Example 9

240 parts (about 1.2 mol) of a resin which has been obtained in known manner by the action of about 1.65 mols of epichlorhydrin on 1 mol of resorcin in an alkaline medium, are dissolved in 133 parts of cyclohexanol, 203 parts of ortho-dichlorobenzene and 75 parts of benzyl alcohol at 100–120° C. To the clear solution are added at 120° C., 62 parts of adipic acid (about 0.4 mol) and 17.5 parts of dicyandiamide (about 0.2 mol) and the whole stirred well at 120–135° C. for 60–90 minutes. The resulting resin of high viscosity is dissolved in a mixture of 95 parts of benzyl alcohol and 200 parts of diacetone alcohol, after which 83 parts of a solution of about 75 per cent strength by weight of hexamethylolmelamine butyl ether in butanol, and 35 parts of dicyandiamide (about 0.4 mol) are admixed. The mixture is stirred for about 1 hour at about 100° C. to obtain a clear, practically neutral resin solution which can be diluted with the usual lacquer solvents to form a finished lacquer.

Coatings made with this lacquer, when hardened at 250–300° C. adhere very well, are flexible, and are resistant to chemicals to a rather high degree.

Example 10

206 parts (about half a mol) of a resin which has been obtained in known manner by reacting about 3.3 mols of epichlorhydrin with 1 mol of 4:4':4''-trihydroxytriphenyl-methane in an alkaline medium, are dissolved in a mixture of 90 parts of cyclohexanol and 50 parts of ortho-dichlorobenzene at about 100° C. The solution is stirred with 42 parts of adipic acid (about 0.3 mol) for 30 minutes at about 110° C. and then with 11 parts of dicyandiamide (about 0.13 mol) for about 45 minutes at 110–120° C. whereby a clear, viscous resin solution is formed. This solution is mixed with 85 parts of ortho-dichlorobenzene, 113 parts of benzyl alcohol, 24 parts of dicyandiamide (about 0.3 mol), 43 parts of a solution of about 75 per cent strength by weight of hexamethylolmelamine butyl ether in butanol, and 135 parts by weight of diacetone alcohol, and stirred for a short while at 100–110° C. during which operation the viscosity rises quickly. The highly viscous resin is then diluted with a mixture of equal parts of benzyl alcohol, diacetone alcohol and ortho-dichlorobenzene to obtain a lacquer solution ready for use.

The resultant lacquer yields quickly hardening, well adhering, hard yet flexible coatings which are stable to humidity and solvents to a rather high degree.

Example 11

A solution, prepared at 100–120° C., of 300 parts of dimethylmethane resin (about 1 mol) in 133 parts of cyclohexanol and 100 parts of ortho-dichlorobenzene is stirred with 72 parts of phthalic anhydride (about 0.5 mol) for about 30 minutes at 120–130° C. 42 parts of dicyandiamide (about 0.5 mol) are then added and the whole is stirred for a further 45 minutes at 125–130° C. The highly viscous, fairly clear resin so obtained in then taken up in a mixture of 150 parts of benzyl alcohol and 250 parts of ortho-dichlorobenzene and again stirred for about 15 minutes at 110–115° C. The resulting resin solution of medium viscosity can be diluted with the usual lacquer solvents to produce a finished lacquer.

The lacquer yields on heating rather slow hardening, very adherent coatings which are insensitive to over-heating. When exposed to high temperatures during use the finished baked lacquer coatings are still somewhat thermoplastic; at temperatures up to about 80° C., however, they are hard and scratch-resistant.

*Example 12*

300 parts of dimethylmethane resin (about 1 mol) are dissolved in 133 parts of cyclohexanol at about 120° C. The clear solution is heated with 74 parts of phthalic anhydride (about 0.5 mol) for 45 minutes at 120–130° C. 42 parts of dicyandiamide (about 0.5 mol) are then added and the whole is stirred for 60 minutes at 120–145° C. The fairly clear, highly viscous resin is taken up in a mixture of 75 parts of benzyl alcohol and 25 parts of ortho-dichlorobenzene and after the addition of 42 parts of dicyandiamide (about 0.5 mol), 95 parts of benzyl alcohol, 89 parts of a solution of about 75 per cent strength by weight of hexamethylol melamine butyl ether in butanol and 210 parts of ethylene glycol monoethyl ether (ethyl-glycol), the whole is heated for about 45 minutes at 100–110° C. In this manner a slightly turbid resin solution of medium viscosity is obtained, which can be diluted in the usual manner to produce a finished lacquer.

Coatings produced with this lacquer harden more rapidly than those produced with the lacquer described in Example 11 and they adhere well and are insensitive to over-hardening. As compared with a coating produced with a resin made from phthalic acid, the above coatings harden somewhat more slowly and are somewhat less flexible.

By replacing the phthalic anhydride in this example by 49 parts of maleic anhydride (about 0.5 mol) there are obtained lacquer coatings having substantially the same properties but which harden somewhat more rapidly on heating and have a better flexibility.

*Example 13*

37 parts of phthalic anhydride (about 0.25 mol) and 21 parts of dicyandiamide (about 0.25 mol) are added to a solution, prepared at 120° C., of 300 parts of dimethylmethane resin (about 1 mol) in 140 parts of cyclohexanol. The mixture is stirred for 45 minutes at 116–145° C. The rather thickly fluid resin so obtained is taken up in a mixture of 75 parts of benzyl alcohol and 225 parts of ortho-dichlorobenzene, whereby about 800 parts of a resin solution of medium viscosity are obtained.

A lacquer produced by diluting the above resin solution in the usual manner yields coatings which harden a little more slowly than those produced as described in Example 11, but have substantially the same properties in other respects.

*Example 14*

800 parts of the resin solution of medium viscosity obtained as described in the first paragraph of Example 13 are mixed with 42 parts of dicyandiamide (about 0.5 mol), 87 parts of a solution of about 75 per cent. strength by weight of hexamethylolmelamine butyl ether in butanol, 95 parts of benzyl alcohol and 210 parts of ethylene glycol monoethyl ether (ethylglycol), and the whole is heated for 1 hour at 100–110° C., whereby a clear resin solution is obtained which can be diluted in the usual manner to produce finished lacquers.

Such a lacquer yields, when hardened with heat, good adherent and flexible lacquer coatings which are insensitive to over-heating. Such coatings have a good heat-resistance at temperatures up to about 150° C.

*Example 15*

740 parts of dimethylmethane resin (about 2.5 mol) are dissolved in 320 parts of cyclohexanol at 120° C. The clear solution is heated to 120° C. for one hour with 149 parts of adipic acid (about 1 mol). 42 parts of dicyandiamide (about 0.5 mol) are then added and the whole is stirred at 120–140° C. for about 60 minutes. The resin of high viscosity is taken up in a mixture of 200 parts of benzyl alcohol, 400 parts of ortho-dichlorobenzene and 120 parts of monochlorobenzene and, after the addition of 60 parts of dicyandiamide (about 0.7 mol), 120 parts of benzyl alcohol, 80 parts of hexamethylolmelamine, 1000 parts of butanol, and 10 parts of lactic acid, heated to about 110° C. while stirring for about 45–60 minutes. A clear resin solution is formed which in the usual manner can be worked into a lacquer ready for use.

The resultant lacquer yields quick-hardening, well adhering, flexible coatings which are stable to humidity and solvents to a rather high degree.

What I claim is:

1. A process for the manufacture of a resin solution suitable as raw material for making lacquers bakeable at high temperatures and yielding very heat resistant coatings, and prepared from a resinous derivative of a polyhydric phenol, which derivative contains at least two ethylene oxide groups and is obtained by reaction of a chlorhydrin selected from the group consisting of epichlorhydrin and dichlorhydrin on the polyhydric phenol in an alkaline medium, in which process a quantity of the ethylene oxide derivative which contains 1 mol of bound polyhydric phenol is heated in the presence of an organic solvent free from carboxyl groups (1) with from about ⅛ to at most ⅝ of one equivalent of a substance of the group consisting of (a) a polybasic carboxylic acid, of which the carboxyl groups are separated from one another by at least two carbon atoms, and (b) an anhydride of such an acid, and (2) with about 0.06 to 0.6 mol of dicyandiamide.

2. A process for the manufacture of a resin solution suitable as raw material for making lacquers bakeable at high temperatures and yielding very heat resistant coatings, and prepared from a resinous derivative of a polyhydric polynuclear phenol, which derivative contains at least two ethylene oxide groups and is obtained by reaction of a chlorhydrin selected from the group consisting of epichlorhydrin and dichlorhydrin on the polyhydric phenol in an alkaline medium, in which process a quantity of the ethylene oxide derivative which contains 1 mol of bound polyhydric phenol is heated in the presence of an organic solvent free from carboxyl groups (1) with from about ⅛ to at most ⅗ of one equivalent of a substance of the group consisting of (a) a polybasic carboxylic acid, of which the carboxyl groups are separated from one another by at least two carbon atoms, and (b) an anhydride of such an acid, and (2) with about 0.06 to 0.6 mol of dicyandiamide.

3. A process for the manufacture of a resin solution suitable as raw material for making lacquers bakeable at high temperatures and yielding very heat resistant coatings, and prepared from a resinous derivative of a polyhydric polynuclear phenol of which the phenol nuclei are connected together by a carbon bridge, which derivative contains at least two ethylene oxide groups and is obtained by reaction of a chlorhydrin selected from the group consisting of epichlorhydrin and dichlorhydrin on the polyhydric phenol in an alkaline medium, in which process a quantity of the ethylene oxide derivative which contains 1 mol of bound polyhydric phenol is heated in the presence of an organic solvent free from carboxyl groups (1) with from about ⅛ to at most ⅗ of one equivalent of a substance of the group consisting of (a) a polybasic carboxylic acid, of which the carboxyl groups are separated from one another by at least two carbon atoms, and (b) an anhydride of such an acid, and (2) with about 0.06 to 0.6 mol of dicyandiamide.

4. A process for the manufacture of a resin solution suitable as raw material for making lacquers bakeable at high temperatures and yielding very heat resistant coatings, and prepared from a resinous derivative of 4:4′-dihydroxydiphenyl-dimethylmethane, which derivative contains at least two ethylene oxide groups and is obtained by reaction of a chlorhydrin selected from the group consisting of epichlorhydrin and dichlorhydrin on the polyhydric phenol in an alkaline medium, in which process a quantity of the ethylene oxide derivative which contains 1 mol of bound polyhydric phenol is heated in the presence of an organic solvent free from carboxyl groups (1) with from about ⅛ to at most ⅗ of one equivalent of a substance of the group consisting of (a) a polybasic carboxylic acid, of which the carboxyl groups are separated from one another by at least two carbon atoms, and (b) an anhydride of such an acid, and (2) with about 0.06 to 0.6 mol of dicyandiamide.

5. A process for the manufacture of a resin solution suitable as raw material for making lacquers bakeable at high temperatures and yielding very heat resistant coatings, and prepared from a resinous derivative of a polyhydric phenol, which derivative contains at least two ethylene oxide groups and is obtained by reaction of a chlorhydrin selected from the group consisting of epichlorhydrin and dichlorhydrin on the polyhydric phenol in an alkaline medium, in which process a quantity of the ethylene oxide derivative which contains 1 mol of bound polyhydric phenol is heated in the presence of an organic solvent free from carboxyl groups (1) with from about ⅛ to at most ⅗ of one equivalent of a substance of the group consisting of (a) a polybasic carboxylic acid, of which the carboxyl groups are separated from one another by at least two carbon atoms, and (b) an anhydride of such an acid, and (2) with about 0.06 to 0.6 mol of dicyandiamide and wherein the heating is carried out also in the presence of an alkyl ether of a formaldehyde condensation product of a substance of the group consisting of melamine, urea, dicyandiamide and phenol.

6. A process for the manufacture of a resin solution suitable as raw material for making lacquers bakeable at high temperatures and yielding very heat resistant coatings, and prepared from a resinous derivative of a polyhydric polynuclear phenol, which derivative contains at least two ethylene oxide groups and is obtained by reaction of a chlorhydrin selected from the group consisting of epichlorhydrin and dichlorhydrin on the polyhydric phenol in an alkaline medium, in which process a quantity of the ethylene oxide derivative which contains 1 mol of bound polyhydric phenol is heated in the presence of an organic solvent free from carboxyl groups (1) with from about ⅛ to at most ⅗ of one equivalent of a substance of the group consisting of (a) a polybasic carboxylic acid, of which the carboxyl groups are separated from one another by at least two carbon atoms, and (b) an anhydride of such an acid, and (2) with about 0.06 to 0.6 mol of dicyandiamide and wherein the heating is carried out also in the presence of an alkyl ether of a formaldehyde condensation product of a substance of the group consisting of melamine, urea, dicyandiamide and phenol.

7. A process for the manufacture of a resin solution suitable as raw material for making lacquers bakeable at high temperatures and yielding very heat resistant coatings, and prepared from a resinous derivative of a polyhydric polynuclear phenol of which the phenol nuclei are connected together by a carbon bridge, which derivative contains at least two ethylene oxide groups and is obtained by reaction of a chlorhydrin selected from the group consisting of epichlorhydrin and dichlorhydrin on the polyhydric phenol in an alkaline medium, in which process a quantity of the ethylene oxide derivative which contains 1 mol of bound polyhydric phenol is heated in the presence of an organic solvent free from carboxyl groups (1) with from about ⅛ to at most ⅗ of one equivalent of a substance of the group consisting of (a) a polybasic carboxylic acid, of which the carboxyl groups are separated from one another by at least two carbon atoms, and (b) an anhydride of such an acid, and (2) with about 0.06 to 0.6 mol of dicyandiamide and wherein the heating is carried out also in the presence of an alkyl ether of a formaldehyde condensation product of a substance of the group consisting of melamine, urea, dicyandiamide and phenol.

8. A process for the manufacture of a resin solution suitable as raw material for making lacquers bakeable at high temperatures and yielding very heat resistant coatings, and prepared from a resinous derivative of 4:4′-dihydroxydiphenyl-dimethylmethane, which derivative contains at least two ethylene oxide groups and is obtained by reaction of a chlorhydrin selected from the group consisting of epichlorhydrin and dichlorhydrin on the polyhydric phenol in an alkaline medium, in which process a quantity of the ethylene oxide derivative which contains 1 mol of bound polyhydric phenol is heated in the presence of an organic solvent free from carboxyl groups (1) with from about ⅛ to at most ⅗ of one equivalent of a substance of the group consisting of (a) a polybasic carboxylic acid, of which the carboxyl groups are separated from one another by at least two carbon atoms, and (b) an anhydride of such an acid, and (2) with about 0.06 to 0.6 mol of dicyandiamide and wherein the heating is carried out also in the presence of an alkyl ether of a formaldehyde condensation product of a substance of the group consisting of melamine, urea, dicyandiamide and phenol.

9. A process for the manufacture of a resin solution suitable as raw material for making lacquers bakeable at high temperatures and yielding very heat resistant coatings, and prepared from a resinous derivative of a polyhydric phenol, which derivative contains at least two ethylene oxide groups and is obtained by reaction of a chlorhydrin selected from the group consisting of epichlorhydrin and dichlorhydrin on the polyhydric phenol in an alkaline medium, in which process a quantity of the ethylene oxide derivative which contains 1 mol of bound polyhydric phenol is heated in the presence of an organic solvent free from carboxyl groups (1) with from about $1/8$ to at most $5/8$ of one equivalent of a substance of the group consisting of (a) a polybasic carboxylic acid, of which the carboxyl groups are separated from one another by at least two carbon atoms, and (b) an anhydride of such an acid, and (2) with about 0.06 to 0.6 mol of dicyandiamide and wherein the heating is carried out in the presence of a further quantity of dicyandiamide and of an alkyl ether of a formaldehyde condensation product of a substance of the group consisting of melamine, urea, dicyandiamide and phenol.

10. A process for the manufacture of a resin solution suitable as raw material for making lacquers bakeable at high temperatures and yielding very heat resistant coatings, and prepared from a resinous derivative of a polyhydric polynuclear phenol, which derivative contains at least two ethylene oxide groups and is obtained by reaction of a chlorhydrin selected from the group consisting of epichlorhydrin and dichlorhydrin on the polyhydric phenol in an alkaline medium, in which process a quantity of the ethylene oxide derivative which contains 1 mol of bound polyhydric phenol is heated in the presence of an organic solvent free from carboxyl groups (1) with from about $1/8$ to at most $5/8$ of one equivalent of a substance of the group consisting of (a) a polybasic carboxylic acid, of which the carboxyl groups are separated from one another by at least two carbon atoms, and (b) an anhydride of such an acid, and (2) with about 0.06 to 0.6 mol of dicyandiamide and wherein the heating is carried out in the presence of a further quantity of dicyandiamide and of an alkyl ether of a formaldehyde condensation product of a substance of the group consisting of melamine, urea, dicyandiamide and phenol.

11. A process for the manufacture of a resin solution suitable as raw material for making lacquers bakeable at high temperatures and yielding very heat resistant coatings, and prepared from a resinous derivative of a polyhydric polynuclear phenol of which the phenol nuclei are connected together by a carbon bridge, which derivative contains at least two ethylene oxide groups and is obtained by reaction of a chlorhydrin selected from the group consisting of epichlorhydrin and dichlorhydrin on the polyhydric phenol in an alkaline medium, in which process a quantity of the ethylene oxide derivative which contains 1 mol of bound polyhydric phenol is heated in the presence of an organic solvent free from carboxyl groups (1) with from about $1/8$ to at most $5/8$ of one equivalent of a substance of the group consisting of (a) a polybasic carboxylic acid, of which the carboxyl groups are separated from one another by at least two carbon atoms, and (b) an anhydride of such an acid, and (2) with about 0.06 to 0.6 mol of dicyandiamide and wherein the heating is carried out in the presence of a further quantity of dicyandiamide and of an alkyl ether of a formaldehyde condensation product of a substance of the group consisting of melamine, urea, dicyandiamide and phenol.

12. A process for the manufacture of a resin solution suitable as raw material for making lacquers bakeable at high temperatures and yielding very heat resistant coatings, and prepared from a resinous derivative of 4:4'-dihydroxydiphenyl-dimethylmethane which derivative contains at least two ethylene oxide groups and is obtained by reaction of a chlorhydrin selected from the group consisting of epichlorhydrin and dichlorhydrin on the polyhydric phenol in an alkaline medium, in which process a quantity of the ethylene oxide derivative which contains 1 mol of bound polyhydric phenol is heated in the presence of an organic solvent free from carboxyl groups (1) with from about $1/8$ to at most $5/8$ of one equivalent of a substance of the group consisting of (a) a polybasic carboxylic acid, of which the carboxyl groups are separated from one another by at least two carbon atoms, and (b) an anhydride of such an acid, and (2) with about 0.06 to 0.6 mol of dicyandiamide and wherein the heating is carried out in the presence of a further quantity of dicyandiamide and of an alkyl ether of a formaldehyde condensation product of a substance of the group consisting of melamine, urea, dicyandiamide and phenol.

13. A resin solution suitable as raw material for making lacquers bakeable at high temperatures and yielding very heat resistant coatings, consisting of (1) an organic solvent free from carboxyl groups and (2) a reaction product of (a) a quantity of a resinous ethylene oxide derivative which contains 1 mol of bound polyhydric phenol, which derivative contains at least two ethylene oxide groups and is obtained by reaction of a chlorhydrin selected from the group consisting of epichlorhydrin and dichlorhydrin on the polyhydric phenol in an alkaline medium, (b) from about $1/8$ to at most $5/8$ of one equivalent of a substance of the group consisting of a polybasic carboxylic acid, of which the carboxyl groups are separated from one another by at least two carbon atoms, and an anhydride of such an acid, and (c) about 0.06 to 0.6 mol of dicyandiamide, said resin solution being obtained by the process according to claim 1.

14. A resin solution suitable as raw material for making lacquers bakeable at high temperatures and yielding very heat resistant coatings, consisting of (1) an organic solvent free from carboxyl groups and (2) a reaction product of (a) a quantity of a resinous ethylene oxide derivative which contains 1 mol of bound polyhydric phenol, which derivative contains at least two ethylene oxide groups and is obtained by reaction of a chlorhydrin selected from the group consisting of epichlorhydrin and dichlorhydrin on the polyhydric phenol in an alkaline medium, (b) from about $1/8$ to at most $5/8$ of one equivalent of a substance of the group consisting of a polybasic carboxylic acid, of which the carboxyl groups are separated from one another by at least two carbon atoms, and an anhydride of such an acid, and (c) about 0.06 to 0.6 mol of dicyandiamide and also of (d) an alkyl ether of a formaldehyde condensation product of a substance of the group consisting of melamine, urea, dicyandiamide and phenol, said resin solution being obtained by the process according to claim 5.

15. A resin solution suitable as raw material for making lacquers bakeable at high temperatures and yielding very heat resistant coatings, consisting of (1) an organic solvent free from carboxyl groups and (2) a reaction product of (a) a quantity of a resinous ethylene oxide derivative which contains 1 mol of bound polyhydric phenol, which derivative contains at least two ethylene oxide groups and is obtained by reaction of a chlorhydrin selected from the group consisting of epichlorhydrin and dichlorhydrin on the polyhydric phenol in an alkaline medium, (b) from about 1/8 to at most 6/8 of one equivalent of a substance of the group consisting of a polybasic carboxylic acid, of which the carboxyl groups are separated from one another by at least two carbon atoms, and an anhydride of such an acid, and (c) about 0.06 to 0.6 mol of dicyandiamide and also (d) an alkyl ether of a formaldehyde condensation product of a substance of the group consisting of melamine, urea, dicyandiamide and phenol, and (e) of a further quantity of dicyandiamide, said resin solution being obtained by the process according to claim 9.

GUSTAV H. OTT.

References Cited in the file of this patent

UNITED STATES PATENTS

| Number | Name | Date |
|---|---|---|
| 2,324,483 | Castan | July 20, 1943 |
| 2,458,796 | Ott et al. | Jan. 11, 1949 |

FOREIGN PATENTS

| Number | Country | Date |
|---|---|---|
| 251,647 | Switzerland | Sept. 1, 1948 |